L. TROPP & B. RIVKIN.
LOCK FOR VEHICLES.
APPLICATION FILED FEB. 25, 1915.

1,202,614.

Patented Oct. 24, 1916.
5 SHEETS—SHEET 1.

Witnesses:
Charles Horton
Titus H. Irons

Inventors
Leopold Tropp.
Bert Rivkin.
by their Attorney
A. B. Mattingly

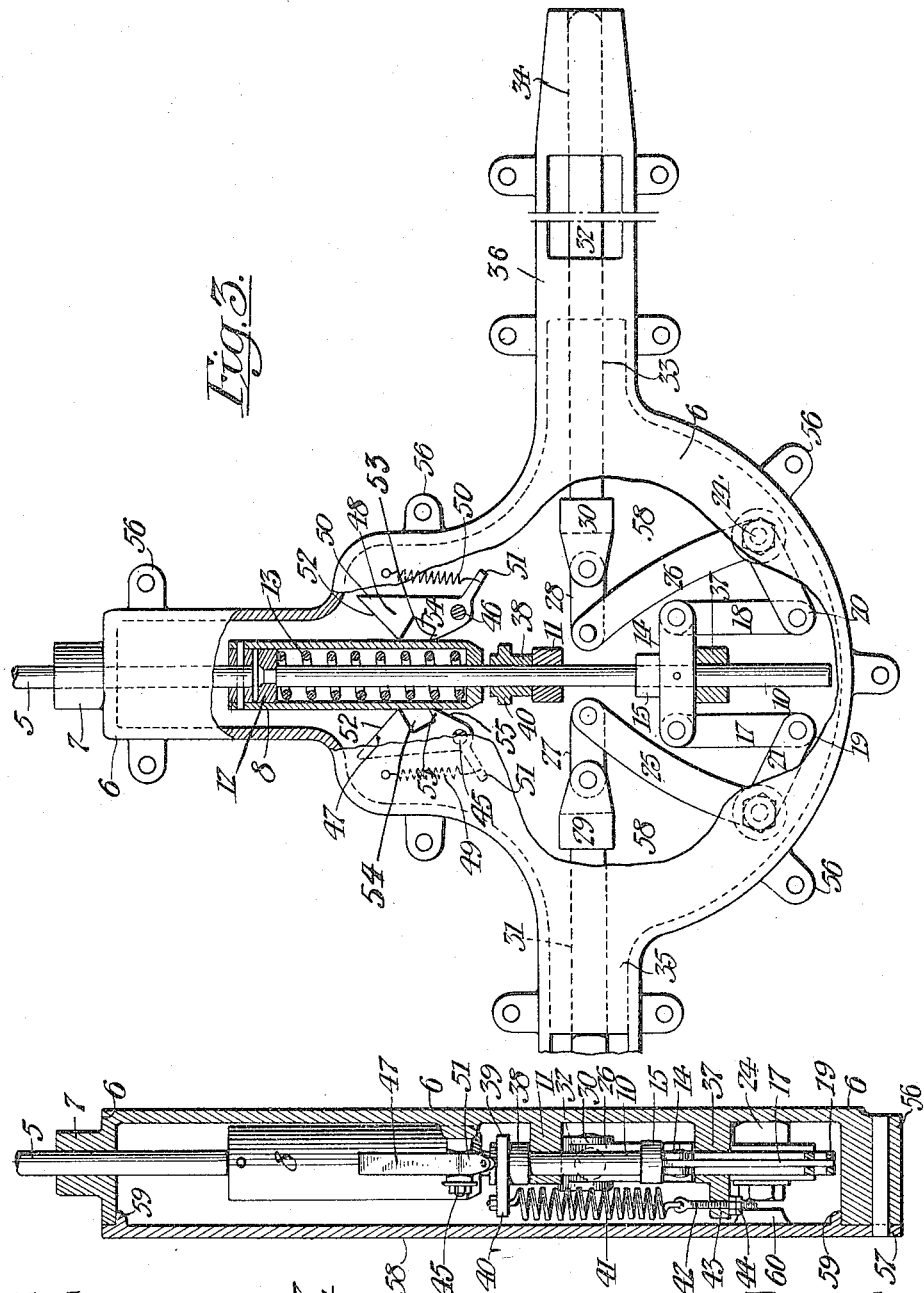

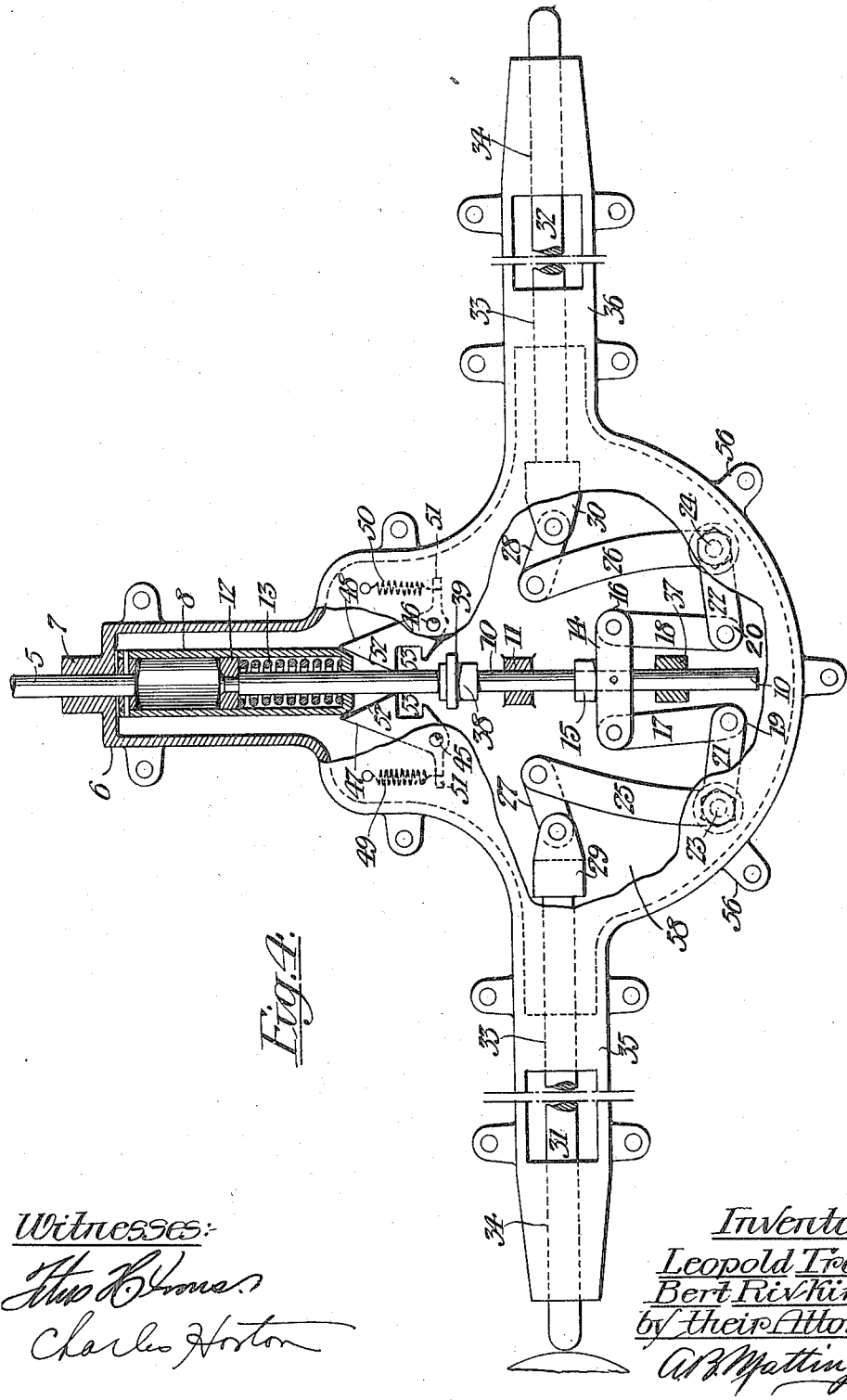

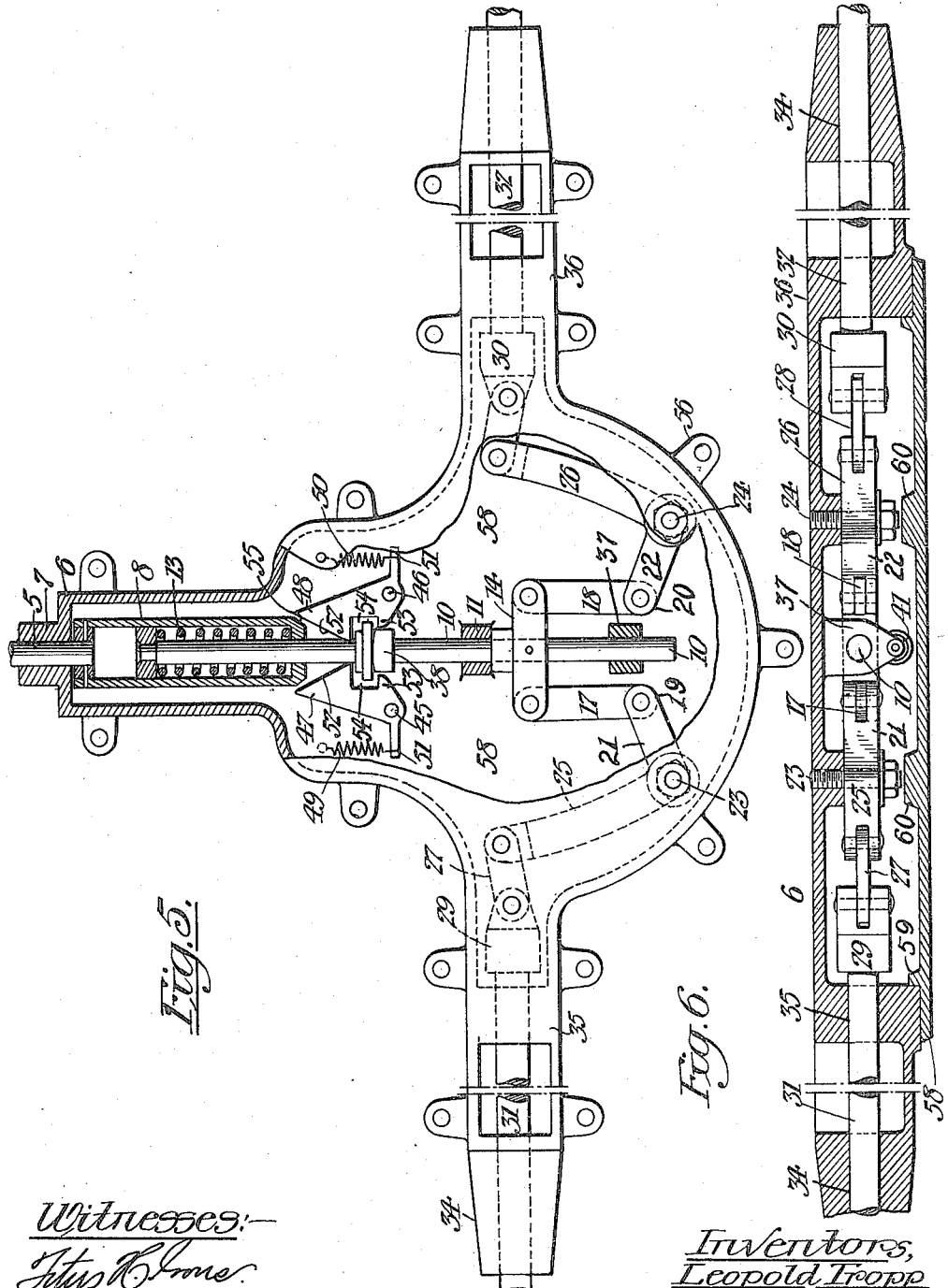

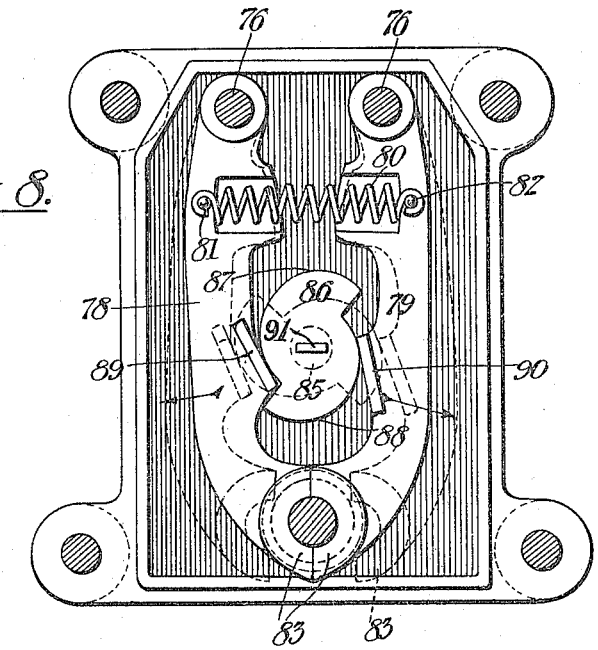
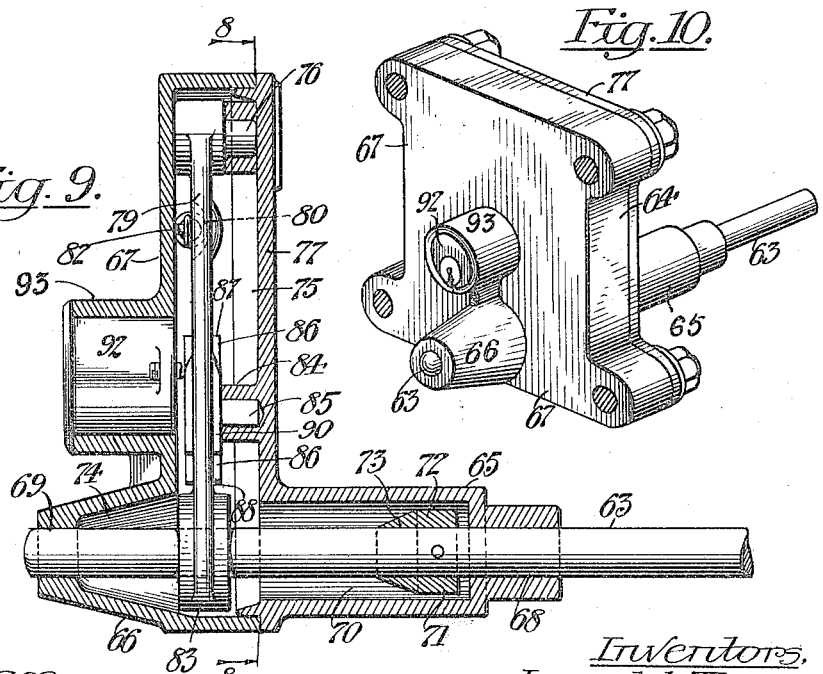

UNITED STATES PATENT OFFICE.

LEOPOLD TROPP, OF BROOKLYN, AND BERT RIVKIN, OF NEW YORK, N. Y., ASSIGNORS TO SECURITY VEHICLE LOCK & BRAKE CO., INC., A CORPORATION OF NEW YORK.

LOCK FOR VEHICLES.

1,202,614.      Specification of Letters Patent.      Patented Oct. 24, 1916.

Application filed February 25, 1915. Serial No. 10,515.

*To all whom it may concern:*

Be it known that we, LEOPOLD TROPP and BERT RIVKIN, citizens of the United States, and residents, respectively, of Brooklyn, in the county of Kings, and New York, in the county of Bronx, State of New York, have invented certain new and useful Improvements in Locks for Vehicles, of which the following is a specification.

This invention relates to improvements in locks for vehicles, and more particularly to positive locks for vehicles, and is adaptable to all styles of wagons, carts, automobiles and so forth.

The object of the invention is to provide a simple and inexpensive means for locking a vehicle to prevent the theft thereof.

The further object is to provide a lock of this kind which will prevent the rear wheels of the vehicle from revolving and cause them to drag upon the road bed and thus prevent the vehicle from being easily and quickly transferred from one locality to another, and if a theft is being perpetrated the culprit can be easily overtaken and located by the tracks made by the dragging wheels, and the locked wheel of the vehicle will also indicate, if the vehicle is in motion, that a theft is being committed.

The still further object is to provide a lock of this character which cannot be released by any one except he is provided with the proper key, and to prevent dishonest drivers after leaving the employment of a firm from using a duplicate key which they may have made while in charge of the vehicle.

With these and other objects in view, it will be seen that we accomplish the foregoing, by referring to the accompanying drawings forming a part of this specification and showing one of the principal embodiments of our invention, and while we have shown this one principle we wish it understood that many other changes may be made in the various parts and arrangement thereof without departing from the spirit and scope of our invention, and we wish to reserve these rights.

Figure 1:
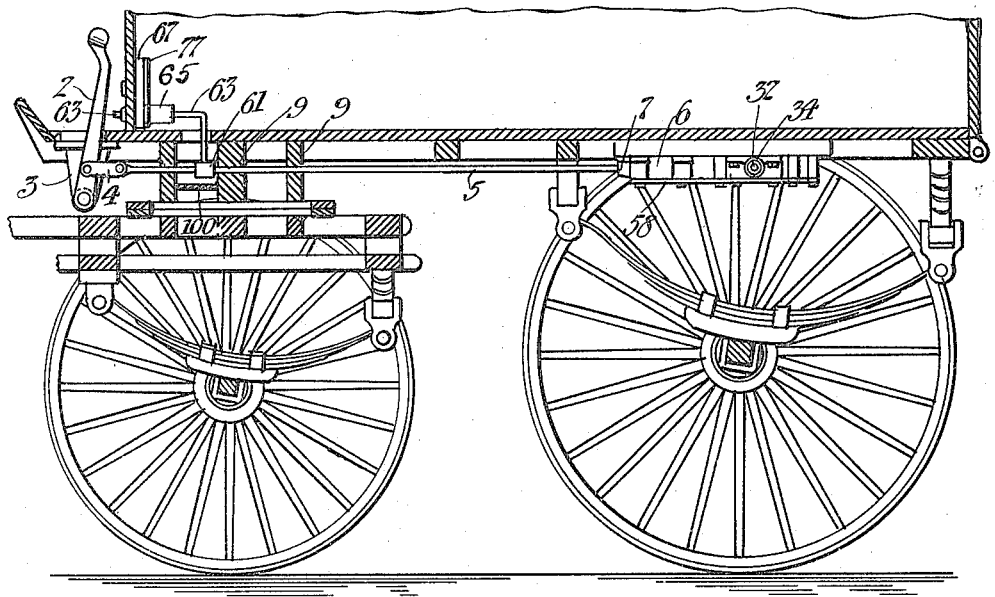
Figure 2:
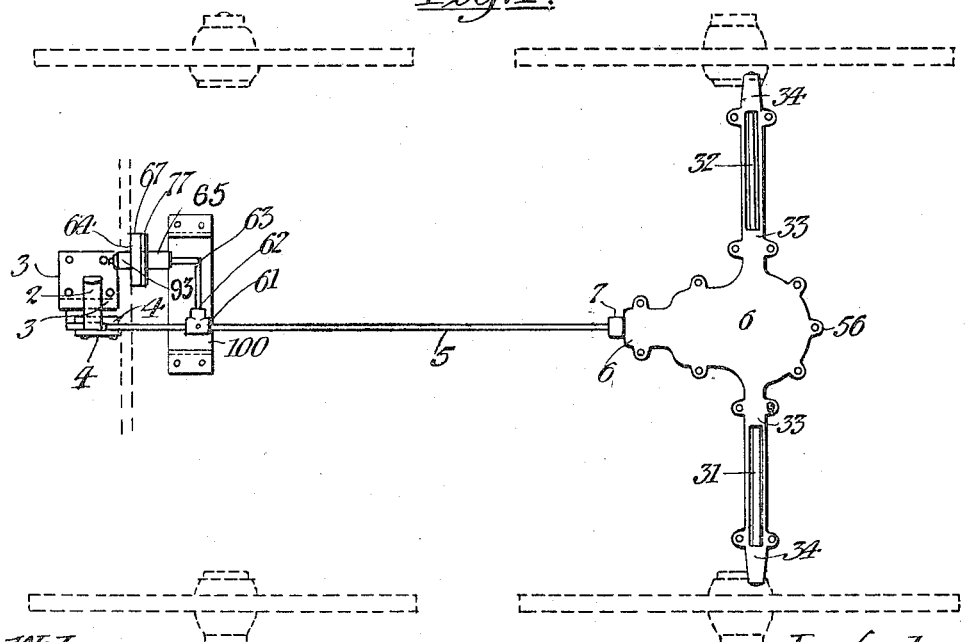

Referring to the accompanying drawings, Figure 1 is a side elevation of one style of delivery wagon partly in section or broken away to more clearly show our invention and how it is applied; Fig. 2 is a plan of our invention as shown in Fig. 1, a portion of the wagon being shown or indicated by dotted lines; Fig. 3 is a partial plan of the locking device with a portion of its casing broken away and a part of its mechanism in section and all of its parts in the normal or unlocked position; Fig. 4 is a view similar to Fig. 3, but showing what happens when the foot lever has been fully operated and locked, but the locking members or plungers having come in contact with a spoke prevent the locking mechanism from fully operating; Fig. 5 is a view similar to Fig. 3, but showing the mechanism and the foot lever locked; Fig. 6 is a rear end elevation of the locking mechanism and having its casing broken away; Fig. 7 is a side elevation of the locking mechanism with its casing broken away; Fig. 8 is a front elevation of the lock with its front plate removed; Fig. 9 is a central vertical section of the lock; and Fig. 10 is a perspective view of the lock.

Referring to Figs. 1 and 2, it will be seen that we provide a lock mechanism for a standard make of wagon. The mechanism is operated by the foot of the driver, but can only be released by a key, and consists of a foot lever 2 pivoted to a suitable bracket 3. Connected to the foot lever 2 by a pair of links 4 is a main operating rod 5, which passes into the casing 6 through a bearing 7 and is connected to the spring cylinder 8 in any suitable manner, but for convenience we have shown a disk closing the end of the cylinder and a pin which has its ends riveted passing through the three pieces. The rod 5 may be provided with any number of bearings formed by the frame of the wagon as shown at 9, or formed in any other suitable manner and secured to the vehicle.

Within the casing 6 is a secondary operating rod 10 slidably mounted in bearings 11 and 37 and extending into the spring cylinder 8 and having a disk 12 riveted upon its end, and a strong compression spring 13 surrounds the rod 10 and lies between the disk 12 and the end of the cylinder. Between the bearings 11 and 37 on the rod 10 is a cross member 14 provided with a hub 15 and having bifurcated ends 16 for receiving links 17 and 18, which are connected to the bifurcated ends 19 and 20 of the bell cranks 21, 22. The bell cranks are mounted on studs 23 and 24 secured in the casing 6. The long ends 25 and 26 of the bell cranks are also bifurcated to receive the pivoted links 27 and 28 of the bifurcated ends 29 and 30 of the plungers 31 and 32, which are slidably mounted in bearings 33 and 34 of the extensions 35 and 36 of the casing 6. Beyond the bearing 11 on the rod 10 is a collar 38 having a flange 39 provided with a downward extension 40 to which is connected a spring 41 having an eye bolt 42, which passes through the extension 43 of the bearing 37 and having lock nuts 44.

Within the casing 6, and mounted on studs 45 and 46, are spring-actuated latches 47 and 48 having operating springs 49 and 50, one end of which is connected to the casing and the other to an arm 51 of the latch. The latches 47 and 48 are provided with cam faces 52 which operate in conjunction with the end of the cylinder 8. The locking noses 53 of the latches 47 and 48 are formed by the notches 54 and the cam faces 55, which are operated by the flange 39 on collar 38 in some instances, when the occasion requires it to do so, as when the plunger or plungers strike a spoke as shown in Fig. 4.

The casing 6 is provided with suitable ears or extensions 56 which register with the ears or extensions 57 of the cover 58, (see Fig. 7), through which bolts pass to secure the casing to the vehicle. The cover 58 is provided with an upwardly extending flange 59 to properly locate it and is further provided with bosses 60 under each stud of the casing 6 to prevent the nuts working off in case they become loose.

Referring to Figs. 1, 2, 8, 9 and 10, it will be seen that the rod 5 is provided with a collar 61 suitably fastened thereto, and the collar has a hub 62 in which is secured a rod 63, and for convenience in locating the positive lock 64 the rod 63 passes a short distance at right angles to the rod 5 and then turns and extends up through the bottom of the vehicle and turns then parallel with the rod 5 and passes through the extension 65 of the lock 64 and out through the extension 66 of the front plate 67. The ends of the extensions 65 and 66 form bearings 68 and 69 for the rod 63, which has pinned to it within the chamber 70 of the extension 65 the locking member 71, comprising a cylindrical collar 72 having a tapered end 73. Within the chamber 75 formed by the front and back plates of the lock 64, and mounted on the studs 76 of the back plate 77, are a pair of swinging arms 78 and 79, which are held together by a spring 80 connected thereto by pins or studs 81 and 82. The tension of the spring 80 keeps the lower ends of the arms together so as to cause the flanged ends 83, which are of a semi-circular formation, to encircle the rod 63 and permit the locking member 71 to force the arms apart, (as shown in Fig. 8 in dotted lines), and allow it to pass from the chamber 70 into the chamber 74, (see Figs. 8 and 9).

Located in the boss 84 on a pivot 85 is a cam disk 86 having two cam faces 87 and 88 which operate against the cam faces 89 and 90 of the arms 78 and 79 for throwing open the arms when it is desired to release the locking member 71. The cam disk 86 is provided with an elongated hole 91 for the extension bar of the Yale lock 92 located and secured in the extension 93 on the front plate 67 of the lock, and through which, by means of a key, the cam disk 86 is operated.

In order that the connection 61 may not be tampered with a suitable shield 100, which is made of sheet steel and so formed as to fit the structure of the vehicle, is provided, (see Figs. 1 and 2).

The operation of this device is very simple and effective.

When it is desired to lock the vehicle all that is necessary is for the driver to push forward the foot lever 2, which causes the rods 5 and 63 to move forward until the locking member 71 forces the arms 78 and 79 apart and the locking member 71 passes into the chamber 74 and the spring 80 causes the arms 78 and 79 to snap behind the locking member 71 and thus hold it until released by the key. The forward movement of the rod 5 carries the spring drum 8 and the rod 10 in the same direction, and the movement of the rod 10 carrying the yoke 14 causes the pivoted links 17 and 18 to swing the bell cranks 21 and 22 on their studs and through the links 27 and 28 cause the plungers 31 and 32 to move in opposite directions from each other and to protrude between the spokes of the rear wheels of the vehicle, (see Fig. 5). When the spring drum moves forward the latches 47 and 48 close and have their noses held against the rod 10 by the springs 49 and the collar 38 on the rod 10 having passed forward so that the flange 39 is in the notches 54 this prevents the plungers from being pushed back, as will be plainly seen.

It will be noted that while we have shown two latches 47 and 48 either may be dispensed with and the rod 10 would still be locked in its position by the remaining latch; but we prefer to use the two so as to insure safety in case either of the springs 49 fails to operate one of the latches.

By referring to Fig. 4 it will be seen why this mechanism has to be made elastic and yet very positive. Either of the plungers 31 and 32 is liable at any time to strike a spoke of the wheel, as shown in Fig. 4, and in this case the driver having pushed the foot lever far enough to lock the rods 5 and 63 the striking of the plunger against the spoke will prevent the full movement of the plungers, bell cranks, and the rod 10, and cause the spring 13 to be compressed and be ready to operate the rod 10 as soon as the vehicle moves and allows the plunger to move out between the spokes and the rod 10 to move forward and the flange 39 of the collar 28 to strike the cam faces 55 of the latches 47 and 48 and open them and pass into the notches 54 and lock the mechanism. It will be noted that when the mechanism is locked the spring 13 is under tension, (see Fig. 5), and when it is desired to unlock the mechanism all that is necessary is to insert the key in the lock and turn the disk 86 so that the cam faces 87 and 88 will open the arms 78 and 79 and release the locking member 71, thus allowing the spring 13 to expand and force the spring cylinder backward and its tapered end to open the latches 47 and 48 and release the collar 38 and allow the spring 41 to return all the parts to their normal position, (see Figs. 3 and 7).

We claim as our invention:

1. In combination with a vehicle, a pivoted lever secured to the vehicle, a pair of bell crank levers, an operating rod connecting the said lever to said bell crank levers, a pair of plungers operating in a transverse direction to the operating rod and operated by the bell cranks for locking the wheels of the vehicle, a casing secured to the vehicle for inclosing and supporting the mechanism, means for positively locking the operating rod against backward movement until released by a special key, and means for allowing the operating rod to be locked before the plungers have been fully operated.

2. In combination with a vehicle, a pivoted lever secured to the vehicle, a pair of bell crank levers, an operating rod connecting the said lever to said bell crank levers, a pair of plungers operating in a transverse direction to the operating rod and operated by the bell cranks for locking the wheels of the vehicle, a casing secured to the vehicle for inclosing and supporting the mechanism, means for positively locking the operating rod against backward movement until released by a special key, means for allowing the operating rod to be locked before the plungers have been fully operated, and means for locking the plungers independently of locking the operating rod.

3. In combination with a vehicle, a pivoted lever secured to the vehicle, a pair of plungers operating in a transverse direction to the said lever and opposite directions to each other, an operating rod having a hollow member secured to its end, a secondary operating rod protruding from the hollow member, a resilient member located within the hollow member for actuating the plungers when necessary, an independent locking member secured on the secondary operating rod and means for locking the secondary rod, a pair of bell crank levers pivotally connected by links to the secondary operating rod, the aforesaid pair of plungers pivotally connected to the bell cranks and operated thereby, a casing secured to the vehicle for inclosing the mechanism and supporting the same, and means for locking the main operating rod against backward movement until released by a special key.

4. In combination with a vehicle, a pivoted lever secured to the vehicle, an operating rod having a hollow member secured to its end, a secondary operating rod protruding from the hollow member, a resilient member located within the hollow member for actuating the plungers when necessary, a pair of bell crank levers pivotally connected by links to the secondary operating rod, a pair of plungers pivotally connected to the bell cranks and operated thereby, a casing secured to the vehicle for inclosing the mechanism and supporting the same, means for locking the main operating rod against backward movement until released by a special key, and means for locking the secondary operating rod against backward movement.

5. In combination with a vehicle, a pivoted lever secured to the vehicle, an operating rod having a hollow member secured to its end, a secondary operating rod protruding from the hollow member, a resilient member located within the hollow member for actuating the plungers when necessary, a pair of bell crank levers pivotally connected by links to the secondary operating rod, a pair of plungers pivotally connected to the bell cranks and operated thereby, a casing secured to the vehicle for inclosing the mechanism and supporting the same, means for locking the main operating rod against backward movement until released by a special key, means for locking the secondary operating rod against backward movement, and means for unlocking the secondary operating rod before all of the parts return to their normal position.

6. In combination with a vehicle, a pivoted lever secured to the vehicle, an operating rod having a hollow member secured to its end, a secondary operating rod protruding from the hollow member, a resilient member located within the hollow member for actuating the plungers when necessary, a pair of bell crank levers pivotally connected by links to the secondary operating rod, a pair of plungers pivotally connected to the bell cranks and operated thereby, a casing secured to the vehicle for inclosing the mechanism and supporting the same, means for locking the main operating rod against backward movement until released by a special key, and a spring actuated latch working in conjunction with a collar located on the secondary rod for locking it against backward movement until the operating rod is released.

7. In combination with a vehicle, a pivoted lever secured to the vehicle, an operating rod having a hollow member with a tapered end secured to its end, a secondary operating rod protruding from the hollow member, a resilient member located within the hollow member for actuating the plungers when necessary, a pair of bell crank levers pivotally connected by links to the secondary operating rod, a pair of plungers pivotally connected to the bell cranks and operated thereby, a casing secured to the vehicle for inclosing the mechanism and supporting the same, means for locking the main operating rod against backward movement until released by a special key, and a pair of spring actuated latches working in conjunction with a collar located on the secondary rod for locking it against backward movement until the operating rod is released.

8. In combination with a vehicle, a pivoted lever secured to the vehicle, a pair of bell crank levers, an operating rod connecting the said lever to said bell crank levers, a pair of plungers operating in a transverse direction to the operating rod and operated by the bell cranks for locking the wheels of the vehicle, a casing secured to the vehicle for inclosing and supporting the mechanism, means for positively locking the operating rod against backward movement until released by a special key, and adjustable means for automatically returning all of the parts to their normal position after the operating rod is released.

9. In combination with a vehicle, a pivoted lever secured to the vehicle, a pair of bell crank levers, an elastic operating rod connecting the said lever to said bell crank levers, a pair of plungers operating in a transverse direction to the operating rod and operated by the bell cranks for locking the wheels of the vehicle, a casing secured to the vehicle for inclosing and supporting the mechanism, means for positively locking the operating rod against backward movement until released by a special key, and adjustable means for automatically returning all of the parts to their normal position after the operating rod is released.

10. In combination with a vehicle, a pivoted lever secured to the vehicle, an operating rod, a casing secured to the vehicle, a pair of spring actuated latches within the casing, a collar secured to the said operating rod adapted to hold the operating rod in a locked position by said latches, a cylinder on the operating rod for releasing the said collar from the latches, a pair of bell cranks pivoted in said casing, a pair of links connecting the bell cranks to said operating rod, a pair of plungers slidably mounted in the casing, a pair of links connecting the plungers with the bell cranks, a collar with an ear on said operating rod, a spring connecting the ear of the collar to the casing for operating the rod in one direction, and means outside of the casing for locking the operating rod which is released by a special key.

11. In combination with a vehicle, a pivoted lever secured to the vehicle, an operating rod, a casing secured to the vehicle, a hollow cylinder connected to the operating rod, a second operating rod slidably mounted in the casing, a disk secured to the second operating rod, a spring within the said cylinder for operating the second rod, a pair of spring actuated latches, a collar secured on the second rod for operating the said latches and locking the rod, a bevel face on the cylinder for operating the latches to release the collar, a pair of bell cranks pivoted in said casing, a pair of links connecting the bell cranks to the second rod, a pair of plungers, a pair of links connecting the plungers to the bell cranks, a collar on the second rod, a spring connecting the said collar to the casing for operating the second rod in one direction, and means for locking the operating rod from movement and only released by a special key.

Signed at New York, in the county of New York and State of New York, this 17th day of February, A. D. 1915.

LEOPOLD TROPP.
BERT RIVKIN.

Witnesses:
 SELMAN LISS,
 JOSEPH WEISS.

Copies of this patent may be obtained for five cents each, by addressing the "Commissioner of Patents, Washington, D. C."